United States Patent
Lane, Jr.

(10) Patent No.: US 6,502,603 B2
(45) Date of Patent: Jan. 7, 2003

(54) TEST PLUG HANDLE

(76) Inventor: John B. Lane, Jr., 13800 Ranch Rd.-2338, Georgetown, TX (US) 78628-9701

( * ) Notice: Subject to any disclaimer, the term of this patent is extended or adjusted under 35 U.S.C. 154(b) by 27 days.

(21) Appl. No.: 09/859,183

(22) Filed: May 16, 2001

(65) Prior Publication Data

US 2002/0170611 A1 Nov. 21, 2002

(51) Int. Cl.[7] .................................................. F16L 55/10
(52) U.S. Cl. ............................ 138/89; 138/90; 16/903; 16/110.1
(58) Field of Search ............................ 138/89, 90, 93, 138/94; 16/903, 110.1

(56) References Cited

U.S. PATENT DOCUMENTS

| | | | |
|---|---|---|---|
| 3,120,859 A | | 2/1964 | Wakley |
| 3,889,714 A | * | 6/1975 | Wilger et al. .................. 138/89 |
| 4,460,019 A | | 7/1984 | Condon |
| 4,608,858 A | | 9/1986 | McKinnon |
| 4,660,603 A | * | 4/1987 | Tash ............................. 138/92 |
| 4,762,265 A | * | 8/1988 | Baird et al. .................... 138/89 |
| 4,764,332 A | * | 8/1988 | Guina ........................... 138/89 |
| 4,964,438 A | * | 10/1990 | Welty ........................... 138/89 |
| 5,181,543 A | * | 1/1993 | Hendzel ........................ 138/90 |
| 5,353,841 A | | 10/1994 | Mathison et al. |
| 5,660,293 A | * | 8/1997 | Strom ........................... 138/90 |
| 5,771,937 A | | 6/1998 | Collins |
| 6,032,515 A | * | 3/2000 | Huber ........................... 138/90 |

* cited by examiner

Primary Examiner—James Hook
(74) Attorney, Agent, or Firm—James Ray & Associates

(57) ABSTRACT

In combination with a sewer and drain pipe plug testing device including an expandable plug having a flexible strap-like member secured at a one end of the expandable plug which enables removal of the expandable plug from a sewer or drain pipe after testing is complete. The improvement comprises a handle-like member secured to the opposite end of the strap-like member. The handle-like member would have a predetermined size which is at least large enough to prevent entry into the open sewer and drain pipe. There is at least one aperture formed through the handle-like member that has a predetermined shape substantially identical to a nut-like portion of a plug member disposed in the sewer and drain pipe to enable tightening and loosening the plug member into and from, respectively, the sewer and drain pipe. Also, there is at least one round threaded aperture drilled into the handle-like member that intersects the aperture formed into the handle-like member for engaging the nut of a threaded closure plug. This provides for a wing nut bolt to threadedly engage the round aperture and engage the nut of the threaded closure plug while the handle-like member is in contact with the nut of a threaded closure plug.

18 Claims, 4 Drawing Sheets

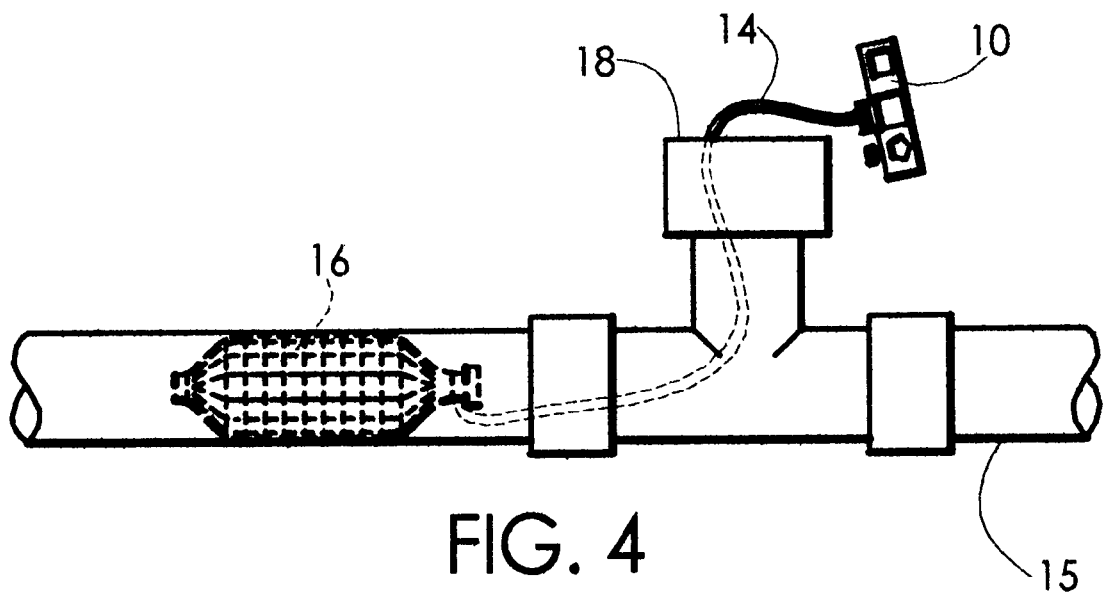
FIG. 4
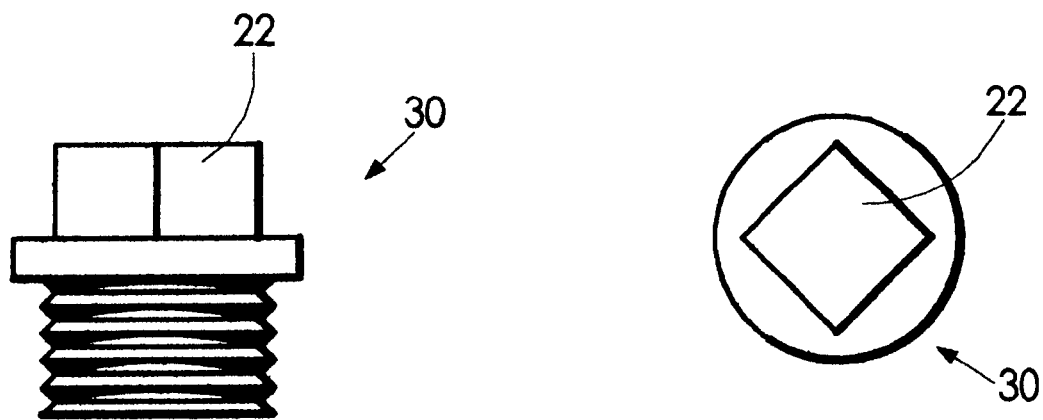
FIG. 5
PRIOR ART
FIG. 6
PRIOR ART

TEST PLUG HANDLE

FIELD OF THE INVENTION

The present invention relates, in general, to sewer and drain plugs for testing plumbing installations and, more particularly, the invention relates to an apparatus for the convenient removal and/or tightening of the threaded closure plug of a sewer test tee.

BACKGROUND OF THE INVENTION.

Prior to the conception of the present invention, an expandable test plug is inserted into a pipe to be tested and expanded to seal a section of pipe to allow pressure to be applied to the pipe section to determine if any leakage exists. The tests are generally conducted from a tee installed in the pipe and, where the test plug is inserted, access is obtained by unscrewing a threaded closure plug. Once the closure plug cap is removed to allow insertion of the expandable test plug, it remains off during the conduction of the test and is usually taped or secured close to the test tee.

Also, prior to the conception of the present invention, it has been known that, after a leakage test of a sewer pipe has been completed, whether on one test location or several within a sub-division or multiple user installation, a person must use an external wrench to tighten the threaded closure plug. In this case, when a worker or plumber is assigned to remove the expandable sewer and drain plug assembly, or several, he or she must carry a wrench with them to each location. The wrenches are easily lost, neglected, or forgotten and become a hindrance to the employer and to the person performing the work due to the expense of replacing such wrench, to labor costs involved in locating a forgotten or lost wrench, or to time lost in locating the wrench.

And, prior to the conception of the present invention, it has been known that, during the leakage test of a sewer pipe, the threaded closure plug that is removed, must be secured to the pipe or tee by wire or tape, requiring the person performing the test to carry wire or tape with them.

SUMMARY OF THE INVENTION

The present invention provides an improved handle-like member for use in combination with a sewer and drain pipe plug testing device. Such sewer and drain pipe plug testing device includes an expandable plug member and a flexible strap-like member secured at a first end thereof to the expandable plug member to enable removal of the expandable plug member from one of a sewer and drain pipe after testing is complete. The improved handle-like member is secured to a second end of the strap-like member. This handle-like member has a predetermined size which is at least large enough to prevent entry into one of an open sewer and drain pipe. There is at least one aperture formed through such handle-like member which has a predetermined shape. Preferably such predetermined shape will be substantially identical to a nut-like portion of a threaded closure plug member disposed in such one of such sewer and such drain pipe to enable each of tightening and loosening the threaded closure plug member into and from, respectively, such one of such sewer and such drain pipe.

OBJECTS OF THE INVENTION

It is, therefore, one of the primary objects of the present invention to provide an apparatus that is attached via strap, chain, rope or cable to an expandable sewer and drain plug that will act as a wrench for removing or tightening a pipe tee cap plug.

Another object of the present invention is to provide an apparatus that may be used as a combination handle and wrench on the end of a strap, cable, chain or rope on the sewer and drain plug test device.

Still another object of the present invention is to provide an apparatus that will provide a sturdy grip to facilitate pulling the sewer and drain test plug device out of the pipe and tee.

Yet another object of the present invention is to provide an apparatus that prevents the sewer and drain test plug assembly moving into the pipe beyond the length of the attached strap.

A further object of the present invention is to provide an apparatus that eliminates the need for a person conducting a test with the expandable plug to have to carry an additional tool.

An even further object of the present invention is to provide an apparatus that secures the threaded closure plug to the handle-like member for the duration of the test.

A still further object of the present invention is to provide an apparatus that is relatively inexpensive to manufacture.

An additional object of the present invention provide an apparatus that it is rather simple to use.

In addition to various objects and advantages of the invention which have been described above, various other objects and advantages of the invention will become more readily apparent to those persons skilled in the relevant art from the following more detailed description of the invention, particularly, when such description is taken in conjunction with the attached drawing figures and the appended claims.

BRIEF DESCRIPTION OF THE DRAWINGS

FIG. 4 is a schematic illustration of a typical test tee with the expandable test plug installed;

FIG. 5 is a side view of a typical threaded test tee cap plug;

FIG. 6 is an overhead or top view of the threaded test tee cap plug illustrated in FIG. 5;

Figure 1:
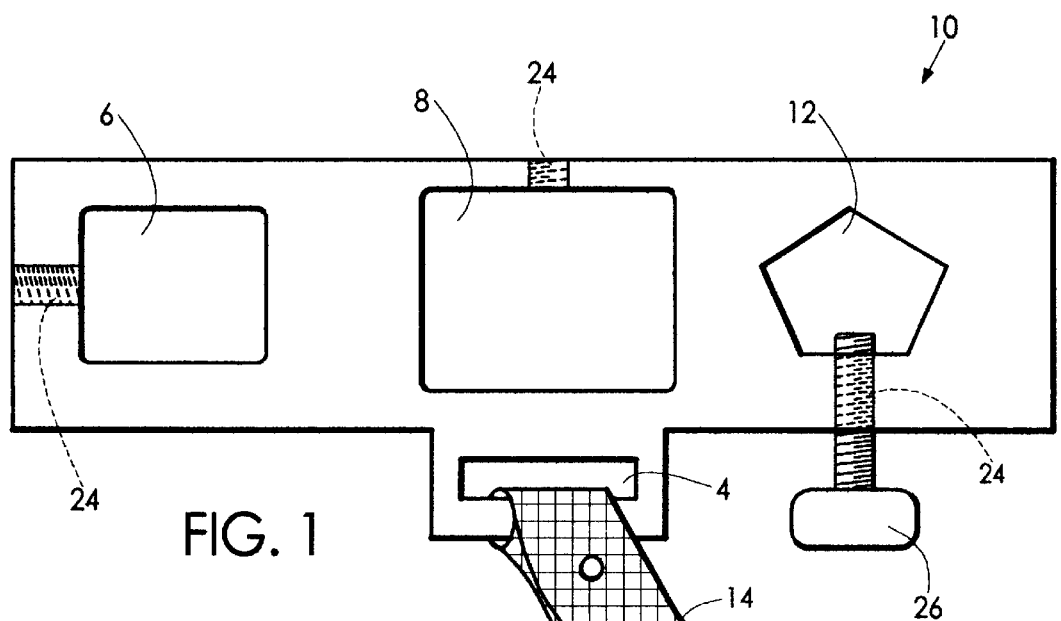
FIG. 1 is a top view of the test plug handle and wing nut according to a presently preferred embodiment of the invention.
Figure 2:
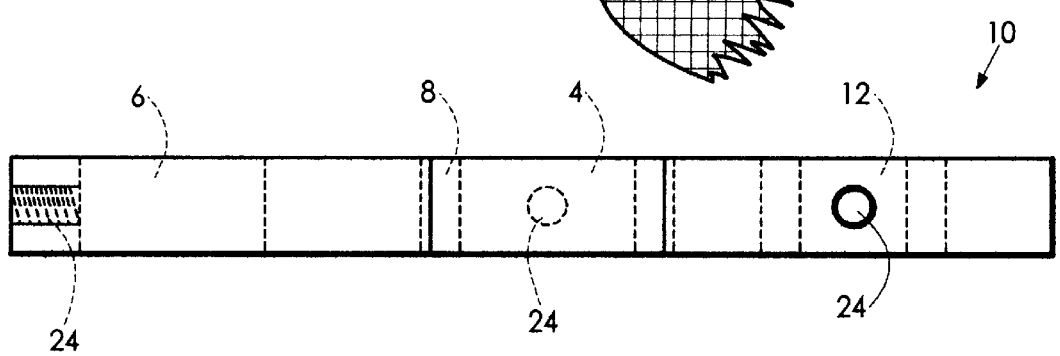
FIG. 2 is a side elevation view. of the test plug handle shown in FIG. 1.
Figure 3:
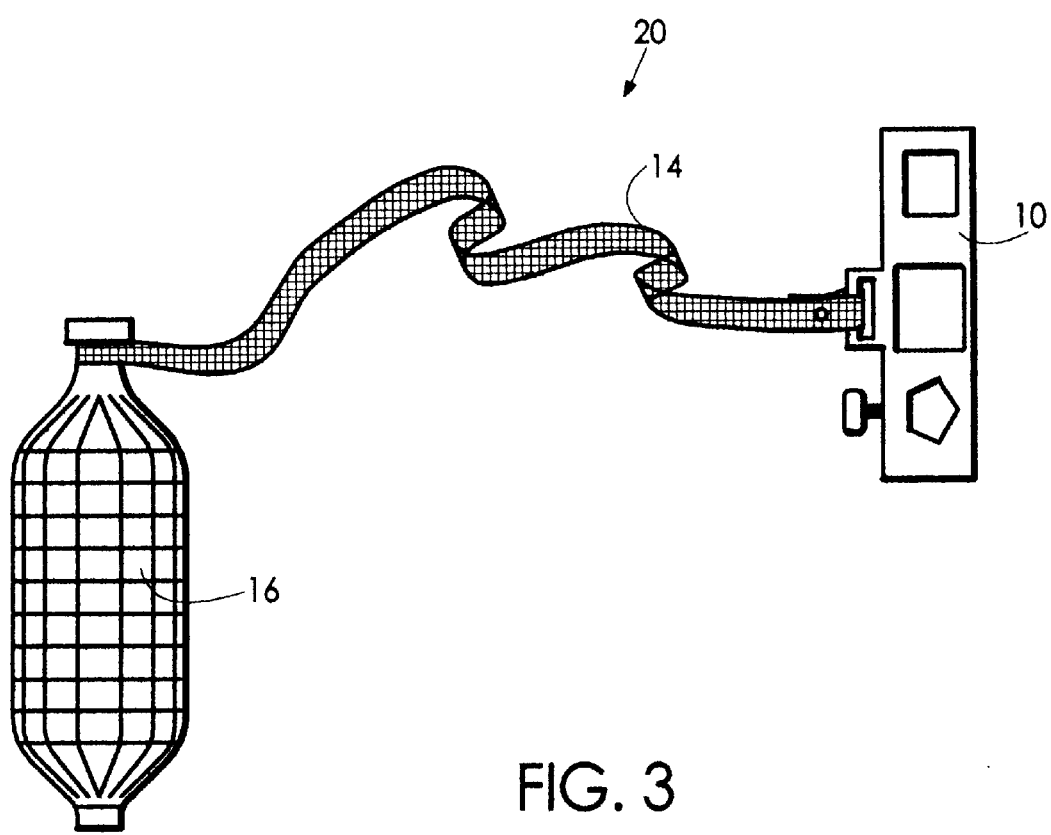
FIG. 3 is a plan view of a typical expandable test plug device with an attached strap and, attached to the strap, the presently preferred embodiment of the invention.

BRIEF DESCRIPTION OF A PRESENTLY PREFERRED AND VARIOUS ALTERNATIVE EMBODIMENTS OF THE INVENTION

Prior to proceeding to a much more detailed description of the present invention, it should be noted that, for the sake of clarity and understanding of the invention, identical components which have identical functions have been designated with identical reference numerals throughout the several views illustrated in the drawing figures.

Reference is now directed, more particularly, to FIG. 1 through 8. Illustrated therein is a top view of the presently preferred embodiment of the test plug handle-like member, generally designated 10, produced according to the instant invention.

Such test plug handle-like member 10 is used in combination with a sewer and drain pipe plug testing device, generally designated 20. The sewer and drain pipe plug testing device 20 includes an expandable plug member 16 and a flexible strap-like member 14 secured at a first end thereof to the expandable plug member 16 to enable removal of such expandable plug member 16 from one of a sewer and drain pipe 15 after testing is complete.

The handle-like member 10 is secured to a second end of the strap-like member 14, the handle-like member 10 having a predetermined size which is at least large enough to prevent entry into an open sewer and drain pipe. There is at least one aperture 6 formed through the handle-like member 10. Illustrated in the figures, however, there are three apertures 6, 8 and 12 shown. The apertures 6, 8 and 12 have a predetermined shape which will be substantially identical to the nut-like portion 22 of a plug member 30 disposed in such sewer and drain pipe tee 18 to enable tightening and loosening plug member 30 in to and from, respectively, the sewer and drain pipe tee 18. The handle-like member 10 is formed from one of metal and plastic and the metal is selected from the group consisting of steel and aluminum, preferably steel. In a presently preferred embodiment of the invention, each of the apertures 6 and 8, in the handle-like member 10, has a substantially an identical shape which is preferably generally rectangular in shape and are of a different size. The handle-like member 10 has an aperture 12 with a different shape.

Figure 7:
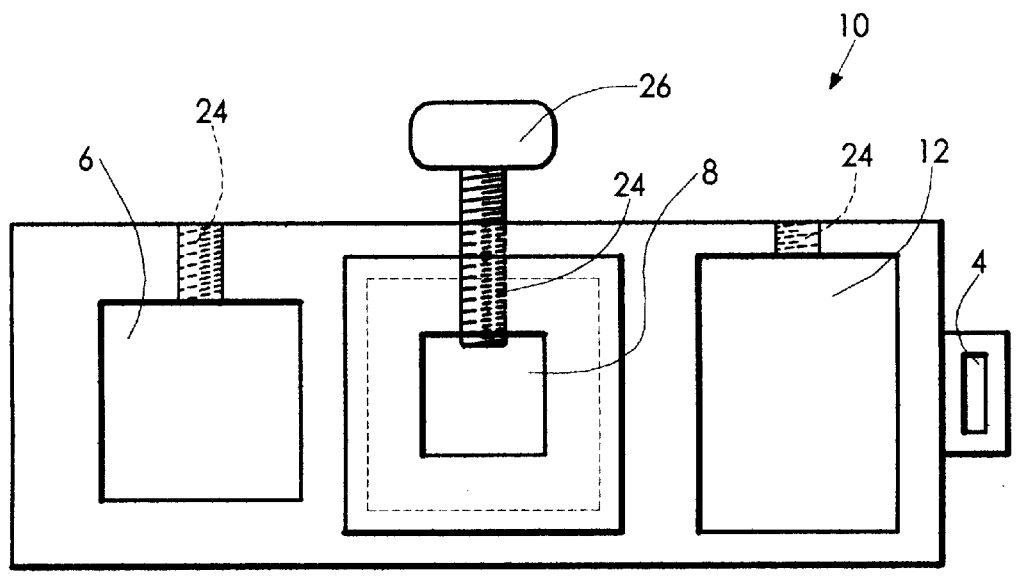
FIG. 7 is a top view of the test plug handle according to an alternative embodiment of the invention.

FIG. 7 illustrates the handle-like member 10 wherein the strap-like member 14 is secured to the handle-like member 10 adjacent one end thereof. Illustrated in FIG. 1 the strap-like member 14 is secured to such handle-like member 10 through aperture 4 intermediate of each end thereof. The strap-like member 14 is formed from one of a chain and a strip-like member and a rope, preferably, the strap-like member 14 is a strip-like member. When strap-like member 14 is made of rope, the rope is formed from one of natural fibers, steel, plastic, and fiberglass.

On the other hand when the strap-like member 14 is formed as a strip-like member, it is formed from one of a fabric material, nylon, plastic, fiberglass, and leather, preferably the strap-like member 14 is formed from a nylon fabric material.

Figure 8:
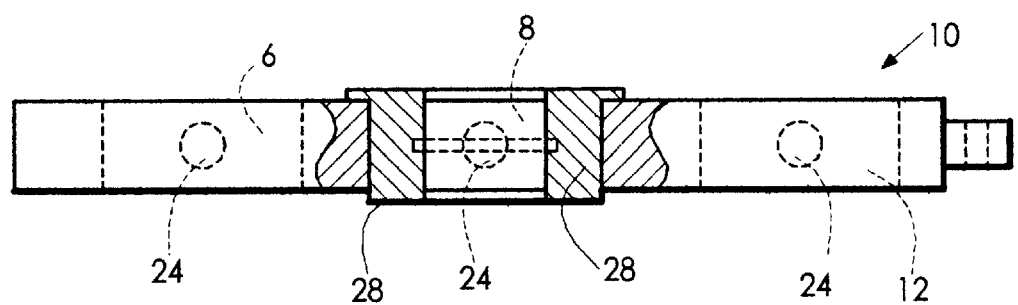
FIG. 8 is a side elevation view of the test plug handle shown in FIG. 7.

In an alternative embodiment of the invention, the handle-like member 10 will include an at least one aperture 8 which is adjustable in size, as has been illustrated in FIGS. 7 and 8. In this embodiment, an insert 28 engages within aperture 8 for changing aperture 8 to a different predetermined size and shape.

Additionally, the handle-like member 10 further includes at least one round aperture 24 at least partially threaded on an axis that will intersect the axis of at least one of the apertures 6, 8 or 12 to enable a wing nut 26 to threadedly engage the nut-like portion 22 of the plug member 30. In this manner, the plug 30 may be secured to the handle-like member during the testing operation.

I claim:

1. In combination with a sewer and drain pipe plug testing device including an expandable plug member, a flexible strap-like member secured at a first end thereof to said expandable plug member to enable removal of said expandable plug member from one of a sewer and drain pipe after testing is complete, the improvement comprising:

(a) a handle-like member secured to a second end of said strap-like member, said handle-like member having a predetermined size which is at least large enough to prevent entry into one of an open sewer and drain pipe; and (b) at least one aperture formed through said handle-like member, said at least one aperture having a predetermined shape which will be substantially identical to a nut-like portion of a plug member disposed in such one of such sewer and such drain pipe to enable each of tightening and loosening plug member into and from, respectively, such one of such sewer and such drain pipe.

2. A handle-like member according to claim 1, wherein said handle-like member is formed from one of metal and plastic.

3. A handle-like member according to claim 2, wherein said metal is selected from the group consisting of steel and aluminum.

4. A handle-like member according to claim 1, wherein said handle-like member includes a predetermined plurality of apertures formed therethrough.

5. A handle-like member according to claim 4, wherein each of said predetermined plurality of apertures has a different shape.

6. A handle-like member according to claim 4, wherein each of said predetermined plurality of apertures has substantially an identical shape.

7. A handle-like member according to claim 6, wherein said each of said predetermined plurality of apertures is generally rectangular in shape.

8. A handle-like member according to claim 7, wherein said each of said predetermined plurality of apertures has a different size.

9. A handle-like member according to claim 1, wherein said strap-like member is secured to said handle-like member adjacent one end thereof.

10. A handle-like member according to claim 1, wherein said strap-like member is secured to said handle-like member intermediate each end thereof.

11. A handle-like member according to claim 1, wherein said strap-like member is one of a chain and a strip-like member and a rope.

12. A handle-like member according to claim 11, wherein said rope member is formed from one of natural fibers, steel, plastic, and fiberglass.

13. A handle-like member according to claim 11, wherein said strap-like member is a strip-like member.

14. A handle-like member according to claim 13, wherein said strap-like member is formed from one of a fabric material, nylon, plastic, fiberglass, and leather.

15. A handle-like member according to claim 14 wherein said strap-like member is formed from a nylon fabric material.

16. A handle-like member according to claim 1, wherein said at least one aperture is adjustable in size.

17. A handle-like member according to claim 1, wherein said handle-like member further includes a means engageable in said at least one aperture for changing said at least one aperture to a predetermined size and to a predetermined shape.

18. A handle-like member according to claim 1, wherein said handle-like member further includes at least one round aperture, said at least one round aperture partially threaded on an axis that intersects an axis of said at least one aperture to enable a wing nut to threadedly engage said nut-like portion of said plug member.

* * * * *